(12) United States Patent
Breuer et al.

(10) Patent No.: US 9,157,410 B2
(45) Date of Patent: Oct. 13, 2015

(54) METHOD AND INTERNAL COMBUSTION ENGINE FOR A SUPERCHARGED INTERNAL COMBUSTION ENGINE

(75) Inventors: Albert Breuer, Cologne (DE); Jan Linsel, Cologne (DE)

(73) Assignee: Ford Global Technologies, LLC, Dearborn, MI (US)

( * ) Notice: Subject to any disclaimer, the term of this patent is extended or adjusted under 35 U.S.C. 154(b) by 514 days.

(21) Appl. No.: 13/565,703

(22) Filed: Aug. 2, 2012

(65) Prior Publication Data

US 2013/0047957 A1     Feb. 28, 2013

(30) Foreign Application Priority Data

Aug. 31, 2011   (DE) ........................ 10 2011 081 844

(51) Int. Cl.
  F02P 5/00       (2006.01)
  F02P 5/15       (2006.01)
  F02D 41/10      (2006.01)
  F02D 41/00      (2006.01)
  F02P 5/152      (2006.01)
  F02B 29/04      (2006.01)
  F02B 37/00      (2006.01)

(52) U.S. Cl.
  CPC ........... *F02P 5/1504* (2013.01); *F02D 41/0007* (2013.01); *F02D 41/10* (2013.01); *F02B 29/0406* (2013.01); *F02B 37/00* (2013.01); *F02D 2250/21* (2013.01); *F02P 5/1521* (2013.01); *Y02T 10/144* (2013.01); *Y02T 10/46* (2013.01)

(58) Field of Classification Search
  CPC .......... F02P 5/103; F02P 5/153; F02D 35/028
  USPC ............. 123/406.11, 406.16, 406.18, 406.21, 123/406.23, 406.24, 406.29, 406.34, 406.35
  See application file for complete search history.

(56) References Cited

U.S. PATENT DOCUMENTS

| | | | | |
|---|---|---|---|---|
| 4,619,236 A * | 10/1986 | Okada et al. | ............... | 123/406.3 |
| 4,727,841 A * | 3/1988 | Hirose et al. | ............. | 123/406.34 |
| 5,070,841 A * | 12/1991 | Fujimoto et al. | .............. | 477/102 |
| 2002/0117147 A1* | 8/2002 | Kimoto | ......................... | 123/306 |
| 2007/0235007 A1* | 10/2007 | Yasui et al. | ............. | 123/406.23 |
| 2008/0162020 A1* | 7/2008 | Itoga et al. | .................... | 701/108 |
| 2009/0133386 A1 | 5/2009 | Porten et al. | | |
| 2009/0150052 A1* | 6/2009 | Kumano et al. | ............... | 701/103 |
| 2010/0071658 A1* | 3/2010 | Soejima et al. | .......... | 123/406.19 |
| 2010/0242472 A1 | 9/2010 | Elsässer et al. | | |
| 2011/0139119 A1* | 6/2011 | Kobayashi | ............... | 123/406.29 |
| 2012/0290193 A1* | 11/2012 | Suzuki et al. | ................ | 701/103 |

* cited by examiner

*Primary Examiner* — John Kwon
(74) *Attorney, Agent, or Firm* — Julia Voutyras; Alleman Hall McCoy Russell & Tuttle LLP

(57) ABSTRACT

Embodiments for a turbocharged engine are provided. In one example, a method for operating a supercharged internal combustion engine including at least one exhaust-gas turbocharger which has a turbine arranged in an exhaust-gas discharge system and a compressor arranged in an intake system, comprises during a load increase $\Delta p_{me}$, retarding ignition timing away from an ignition time $\alpha_{Z,opt}$ optimized with regard to efficiency and beyond an ignition time $\alpha_{Z,knock}$, where $\alpha_{Z,knock}$ is an earliest ignition time to avoid knocking combustion.

20 Claims, 3 Drawing Sheets

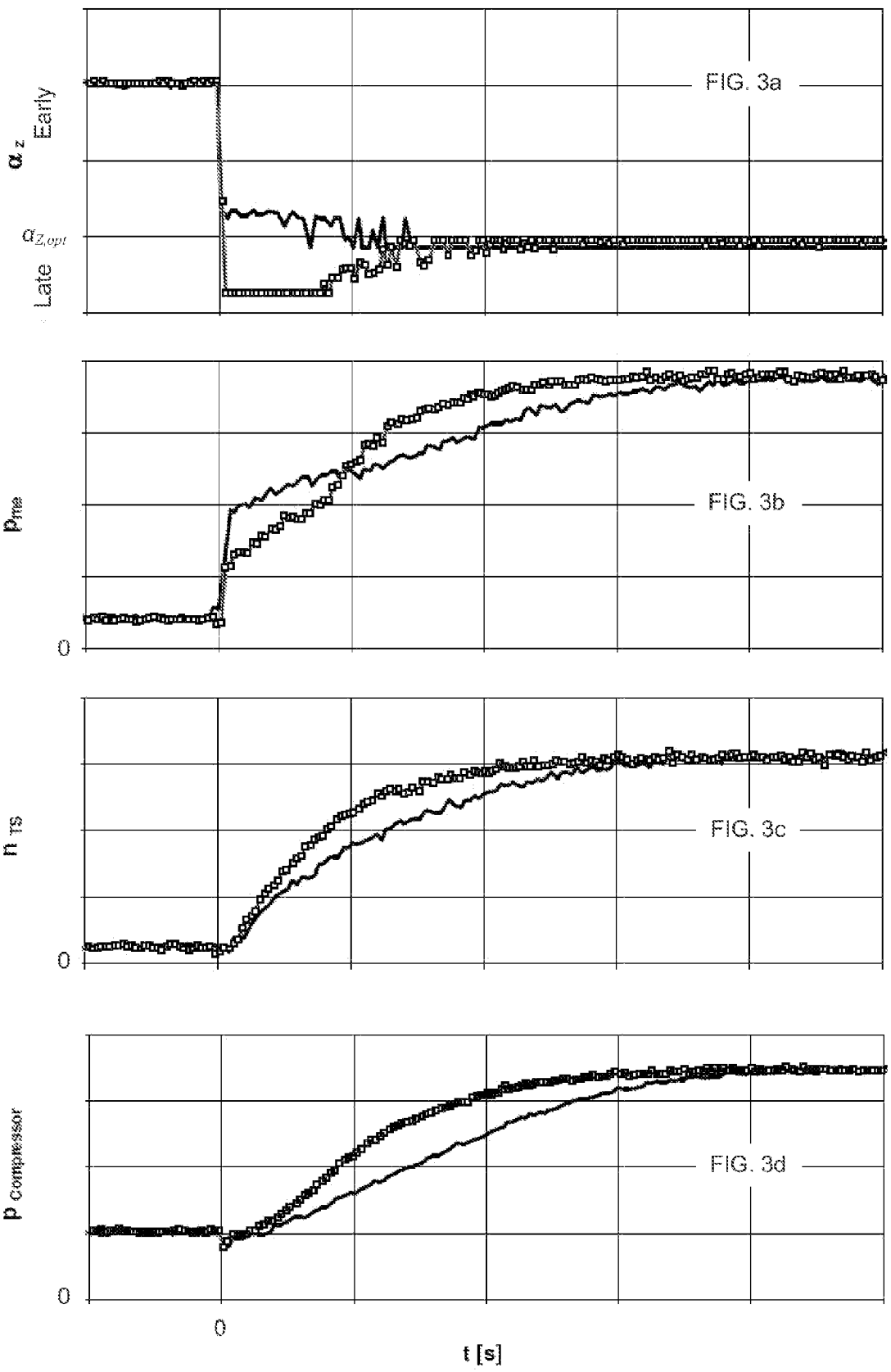

METHOD AND INTERNAL COMBUSTION ENGINE FOR A SUPERCHARGED INTERNAL COMBUSTION ENGINE

RELATED APPLICATIONS

The present application claims priority to German Patent Application 102011081844.8, filed on Aug. 31, 2011, the entire contents of which are hereby incorporated by reference for all purposes.

FIELD

The disclosure relates to a method for operating a supercharged internal combustion engine having at least one exhaust-gas turbocharger

BACKGROUND AND SUMMARY

On account of the limited resources of fossil fuels, in particular on account of the limited availability of mineral oil as a raw substance for the extraction of fuels for internal combustion engines, constant efforts are being made in the development of internal combustion engines to minimize fuel consumption, wherein the focus of the efforts is on obtaining more effective combustion.

A problem is fuel consumption in particular in applied-ignition engines. The reason for this lies in the basic operating process of the traditional spark-ignition engine, which operates with a homogeneous fuel/air mixture which is prepared by means of external mixture formation by virtue of fuel being injected into the intake tract, and in which the desired power is adjusted by means of quantity regulation.

Load control is generally carried out by means of a throttle flap provided in the intake tract. By adjusting the throttle flap, the pressure of the inducted air downstream of the throttle flap can be reduced to a greater or lesser extent. The further the throttle flap is closed, that is to say the more said throttle flap blocks the intake tract, the higher the pressure loss of the inducted air across the throttle flap, and the lower the pressure of the inducted air downstream of the throttle flap and upstream of the inlet into the combustion chamber. For a constant combustion chamber volume, it is possible in this way to adjust the air mass, that is to say the quantity, by means of the pressure of the inducted air. Quantity regulation by means of a throttle flap has thermodynamic disadvantages in particular in the part-load range. This is because low loads require a large pressure drop in the intake tract, and therefore a high degree of throttling. To reduce throttling losses, various strategies have been developed, for example the dethrottling of the spark-ignition engine operating process through the use of a variable valve drive.

Internal combustion engines may be supercharged. Supercharging is primarily a method for increasing power, in which the air for the combustion process in the engine is compressed, but is generally a suitable means for increasing the power of an internal combustion engine while maintaining an unchanged swept volume, or for reducing the swept volume while maintaining the same power. In any case, supercharging leads to an increase in volumetric power output and an improved power-to-weight ratio. For the same vehicle boundary conditions, it is thus possible to shift the load collective toward higher loads, at which the specific fuel consumption is lower. This is also referred to as downsizing.

Supercharging consequently assists in the constant efforts to minimize fuel consumption, that is to say to improve the efficiency of the internal combustion engine.

For supercharging, use may be made of at least one exhaust-gas turbocharger in which a compressor and a turbine are mounted on the same shaft, wherein the turbine is arranged in the exhaust-gas discharge system and the compressor is arranged in the intake system of the internal combustion engine.

The hot exhaust-gas flow is supplied to the turbine and expands in the turbine with a release of energy, as a result of which the shaft is set in rotation. The energy supplied by the exhaust-gas flow to the turbine and ultimately to the shaft is used for driving the compressor which is likewise arranged on the shaft. The compressor delivers and compresses the charge air supplied to it, as a result of which supercharging of the cylinders is obtained. Furthermore, a charge-air cooler may be provided by means of which the compressed charge air is cooled before it enters the combustion chamber. The charge-air cooler lowers the air temperature and thereby increases the density of the air, as a result of which the cooler also contributes to improved charging of the combustion chamber with air, that is to say to a greater air mass.

One advantage of the exhaust-gas turbocharger for example in relation to conventional mechanical chargers is that no mechanical connection is utilized between the charger and internal combustion engine.

Problems are encountered in the configuration of the exhaust-gas turbocharging, wherein it is basically sought to obtain a noticeable performance increase in all rotational speed ranges. According to some systems, a severe torque drop is however observed in the event of a certain rotational speed being undershot. Said torque drop is understandable if one takes into consideration that the charge pressure ratio is dependent on the turbine pressure ratio. In the case of a spark-ignition engine, for example, if the load is reduced, this leads to a smaller exhaust-gas mass flow and therefore to a lower turbine pressure ratio. This has the result that, toward lower rotational speeds, the charge pressure ratio likewise decreases, which equates to a torque drop.

In practice, the described relationships often lead to the use of a small exhaust-gas turbocharger, that is to say an exhaust-gas turbocharger with a small turbine cross section, or of a plurality of exhaust-gas turbochargers.

In the optimization of the exhaust-gas turbocharger arrangement, the response behavior of the exhaust-gas turbocharger arrangement or of the internal combustion engine supercharged by means of the exhaust-gas turbocharger arrangement is likewise of particular interest. It is a problem here that, in certain situations, the internal combustion engine can follow up on the power demand of the driver only with a delay. In particular in the event of a so-called load step, in which the load demand rises abruptly, the exhaust-gas turbocharger reacts with a time offset to provide, that is to say build up, the charge pressure for the demanded load.

An example of such a load step is an overtaking maneuver, in which the power demand is increased abruptly and considerably, generally by several times, as a result of a kickdown of the accelerator pedal. Proceeding from operation of the internal combustion engine at part load, in which the ignition time $\alpha_{Z,opt}$ is set with regard to the highest possible efficiency and therefore the ignition takes place relatively early, upon the initiation of a load step, the ignition time $\alpha_Z$ is shifted abruptly in the late direction, that is to say follows up the abruptly increasing load. Here, the shift of the ignition time in the late direction with increasing load is basically utilized in order to avoid knocking combustion. It is nevertheless sought to perform the ignition as early as possible in order to realize as high an efficiency as possible, that is to say as early as is permitted while still avoiding knocking combustion.

The inventors herein have recognized the above issues and provide an approach to at least partly address them. Accordingly, a method for operating a supercharged internal combustion engine including at least one exhaust-gas turbocharger which has a turbine arranged in an exhaust-gas discharge system and a compressor arranged in an intake system, comprises during a load increase $\Delta p_{me}$, retarding ignition timing away from an ignition time $\alpha_{Z,opt}$ optimized with regard to efficiency and beyond an ignition time $\alpha_{Z,knock}$, where $\alpha_{Z,knock}$ is an earliest ignition time to avoid knocking combustion.

In this way, in the event of a load increase or step $\Delta pme$, the ignition time $\alpha_Z$ is shifted in the late direction proceeding from an ignition time $\alpha_{Z,opt}$ optimized with regard to efficiency. Contrary to the conventional approach, however, the ignition time $\alpha_Z$ is shifted further in the late direction than is necessary to avoid knocking combustion. Whereas it is was case in previous systems that even during the course of a load step, the principle of as early as possible an ignition is adhered to, that is to say ignition takes place as early as possible, in order to ensure high efficiency, it is the case according to the disclosure that the ignition time $\alpha_Z$ is shifted in the late direction beyond an ignition time $\alpha_{Z,knock}$. Here, $\alpha_{Z,knock}$ denotes the earliest ignition time at which no knocking combustion is observed.

The shift of the ignition time in the late direction leads to a shift of the combustion or of the focal point of the combustion in the late direction, that is to say in the direction of the expansion phase.

In this way, the energy released during a first portion of a response to a step load increase of the course of the combustion by the exothermic chemical conversion of the fuel is utilized proportionally less in the form of expansion work, that is to say for increasing the gas forces acting on the piston, and more for increasing the exhaust-gas enthalpy, that is to say for increasing the exhaust-gas temperature and the exhaust-gas pressure. Conversely, a second portion of the response is applied more for expansion work and correspondingly less for exhaust enthalpy. The transition between the first and second portions may be based on a size of the load step (later for larger step increases as compared to smaller step increases), a starting speed of the turbocharger (earlier for higher starting speeds of the turbocharger than for lower starting speeds), etc.

As a result, the hot exhaust gases in the exhaust-gas discharge system at the inlet into the turbine also have a higher exhaust-gas enthalpy which is determined significantly by the exhaust-gas pressure and the exhaust-gas temperature. The response behavior of the turbine, of the exhaust-gas turbocharger and of the supercharged internal combustion engine is improved in this way.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 3a shows a diagram of the ignition angle $\alpha_Z$ over time t during a load step at n=1500 rpm FIG. 3b shows a diagram of the mean effective pressure $p_{me}$ over time t during a load step at n=1500 rpm.

FIG. 3c shows a diagram of the rotational speed $n_{TS}$ of the exhaust-gas turbocharger over time t during a load step at n=1500 rpm.

FIG. 3d shows a diagram of the charge pressure $p_{compressor}$ over time t during a load step at n=1500 rpm. FIGS. 3a-d are time-aligned with one another, and show respective changes with each graph drawn approximately to scale, although the y-axis scale of each figure may be different from the other figures.

DETAILED DESCRIPTION

Figure 1:
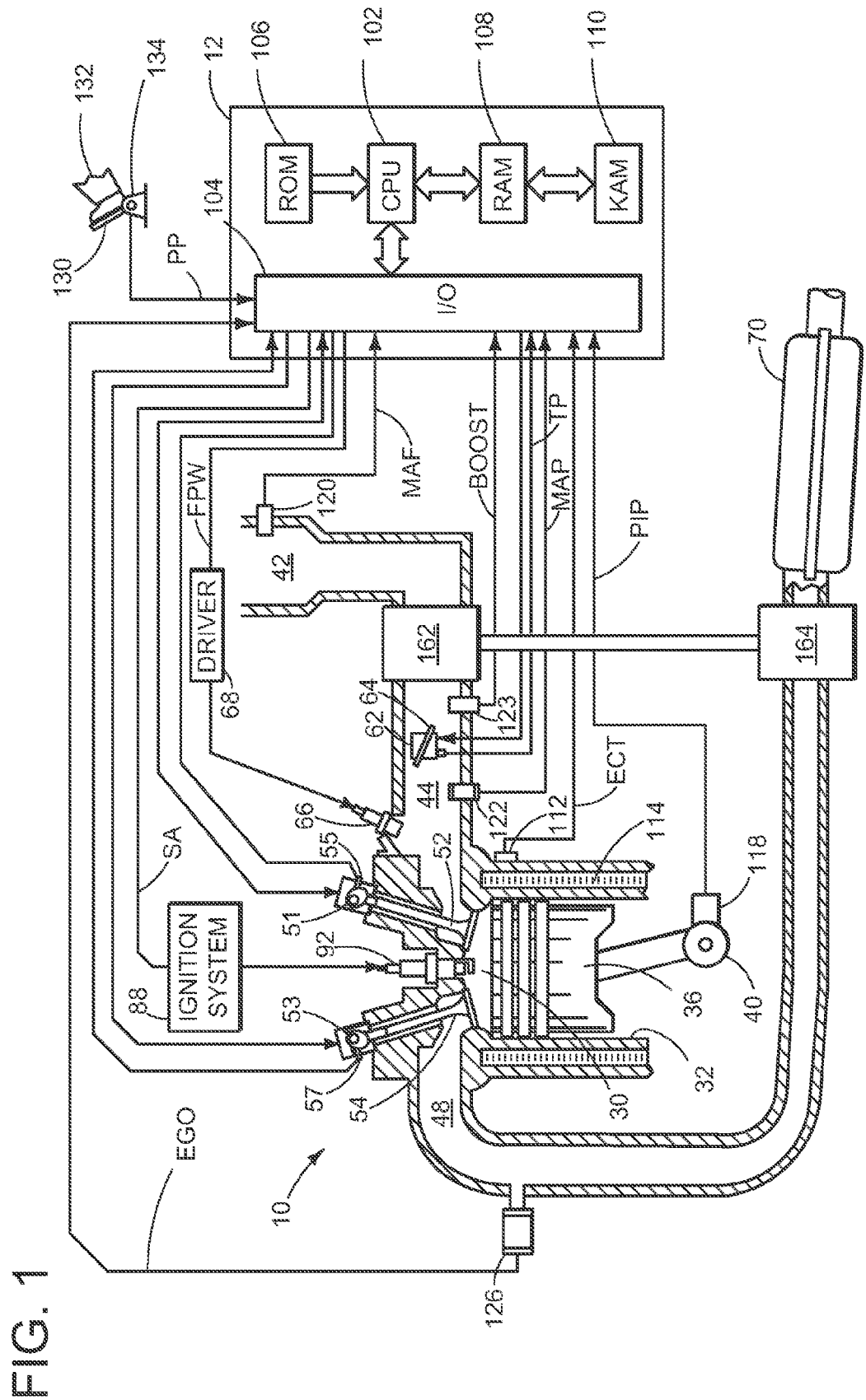
FIG. 1 schematically shows an example single cylinder of a multi-cylinder engine.

During an increase in engine load, such as when an operator of a vehicle rapidly depresses an accelerator pedal (otherwise referred to as a pedal tip-in or load step increase), a lag in the delivered torque may occur as the engine responds to the load request. For turbocharged engines, this lag may be particularly long due to delays from both intake manifold filling and exhaust generation to spin the turbocharger. To counteract delays associated with spinning the turbocharger, ignition timing may be retarded in response to an increase in load. The retarded ignition timing may increase exhaust enthalpy directed to the turbocharger, thus rapidly increasing the speed of the turbocharger. FIG. 1 is an engine including a turbocharger and a controller configured to carry out the method of FIG. 2. FIGS. 3a-3d illustrate example engine parameters during the execution of the method of FIG. 2.

Referring specifically to FIG. 1, it includes a schematic diagram showing one cylinder of multi-cylinder internal combustion engine 10. Engine 10 may be controlled at least partially by a control system including controller 12 and by input from a vehicle operator 132 via an input device 130. In this example, input device 130 includes an accelerator pedal and a pedal position sensor 134 for generating a proportional pedal position signal PP.

Combustion cylinder 30 of engine 10 may include combustion cylinder walls 32 with piston 36 positioned therein. Piston 36 may be coupled to crankshaft 40 so that reciprocating motion of the piston is translated into rotational motion of the crankshaft. Crankshaft 40 may be coupled to at least one drive wheel of a vehicle via an intermediate transmission system. Further, a starter motor may be coupled to crankshaft 40 via a flywheel to enable a starting operation of engine 10.

Combustion cylinder 30 may receive intake air from intake manifold 44 via intake passage 42 and may exhaust combustion gases via exhaust passage 48. Intake manifold 44 and exhaust passage 48 can selectively communicate with combustion cylinder 30 via respective intake valve 52 and exhaust valve 54. In some embodiments, combustion cylinder 30 may include two or more intake valves and/or two or more exhaust valves.

In this example, intake valve 52 and exhaust valve 54 may be controlled by cam actuation via respective cam actuation systems 51 and 53. Cam actuation systems 51 and 53 may each include one or more cams and may utilize one or more of cam profile switching (CPS), variable cam timing (VCT), variable valve timing (VVT) and/or variable valve lift (VVL) systems that may be operated by controller 12 to vary valve operation. The position of intake valve 52 and exhaust valve 54 may be determined by position sensors 55 and 57, respectively. In alternative embodiments, intake valve 52 and/or exhaust valve 54 may be controlled by electric valve actuation. For example, cylinder 30 may alternatively include an intake valve controlled via electric valve actuation and an exhaust valve controlled via cam actuation including CPS and/or VCT systems.

Combustion cylinder 30 includes a fuel injector 66 arranged in intake passage 42 in a configuration that provides what is known as port injection of fuel into the intake port upstream of combustion cylinder 30. Fuel injector 66 injects fuel therein in proportion to the pulse width of signal FPW received from controller 12 via electronic driver 68. Alternatively or additionally, in some embodiments the fuel injector may be mounted on the side of the combustion cylinder or in the top of the combustion cylinder, for example, to provide what is known as direct injection of fuel into combustion cylinder 30. Fuel may be delivered to fuel injector 66 by a fuel delivery system (not shown) including a fuel tank, a fuel pump, and a fuel rail.

Intake passage 42 includes a throttle 62 having a throttle plate 64. In this particular example, the position of throttle plate 64 may be varied by controller 12 via a signal provided to an electric motor or actuator included with throttle 62, a configuration that may be referred to as electronic throttle control (ETC). In this manner, throttle 62 may be operated to vary the intake air provided to combustion cylinder 30 among other engine combustion cylinders. Intake passage 42 may include a mass air flow sensor 120 and a manifold air pressure sensor 122 for providing respective signals MAF and MAP to controller 12.

Ignition system 88 can provide an ignition spark to combustion chamber 30 via spark plug 92 in response to spark advance signal SA from controller 12, under select operating modes. Though spark ignition components are shown, in some embodiments, combustion chamber 30 or one or more other combustion chambers of engine 10 may be operated in a compression ignition mode, with or without an ignition spark.

Engine 10 may further include a compression device such as a turbocharger or supercharger including at least a compressor 160 arranged along intake manifold 44. For a turbocharger, compressor 160 may be at least partially driven by a turbine 162, via, for example a shaft, or other coupling arrangement. The turbine 162 may be arranged along exhaust passage 48. Various arrangements may be provided to drive the compressor. For a supercharger, compressor 160 may be at least partially driven by the engine and/or an electric machine, and may not include a turbine. Thus, the amount of compression provided to one or more cylinders of the engine via a turbocharger or supercharger may be varied by controller 12.

Exhaust gas sensor 126 is shown coupled to exhaust passage 48 upstream of catalytic converter 70. Sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a $NO_x$, HC, or CO sensor. The exhaust system may include light-off catalysts and underbody catalysts, as well as exhaust manifold, upstream and/or downstream air-fuel ratio sensors. Catalytic converter 70 can include multiple catalyst bricks, in one example. In another example, multiple emission control devices, each with multiple bricks, can be used. Catalytic converter 70 can be a three-way type catalyst in one example.

Controller 12 is shown in FIG. 1 as a microcomputer, including microprocessor unit 102, input/output ports 104, an electronic storage medium for executable programs and calibration values shown as read only memory chip 106 in this particular example, random access memory 108, keep alive memory 110, and a data bus. The controller 12 may receive various signals and information from sensors coupled to engine 10, in addition to those signals previously discussed, including measurement of inducted mass air flow (MAF) from mass air flow sensor 120; engine coolant temperature (ECT) from temperature sensor 112 coupled to cooling sleeve 114; a profile ignition pickup signal (PIP) from Hall effect sensor 118 (or other type) coupled to crankshaft 40; throttle position (TP) from a throttle position sensor; and absolute manifold pressure signal, MAP, from sensor 122. Storage medium read-only memory 106 can be programmed with computer readable data representing instructions executable by processor 102 for performing the methods described below as well as variations thereof.

Figure 2:
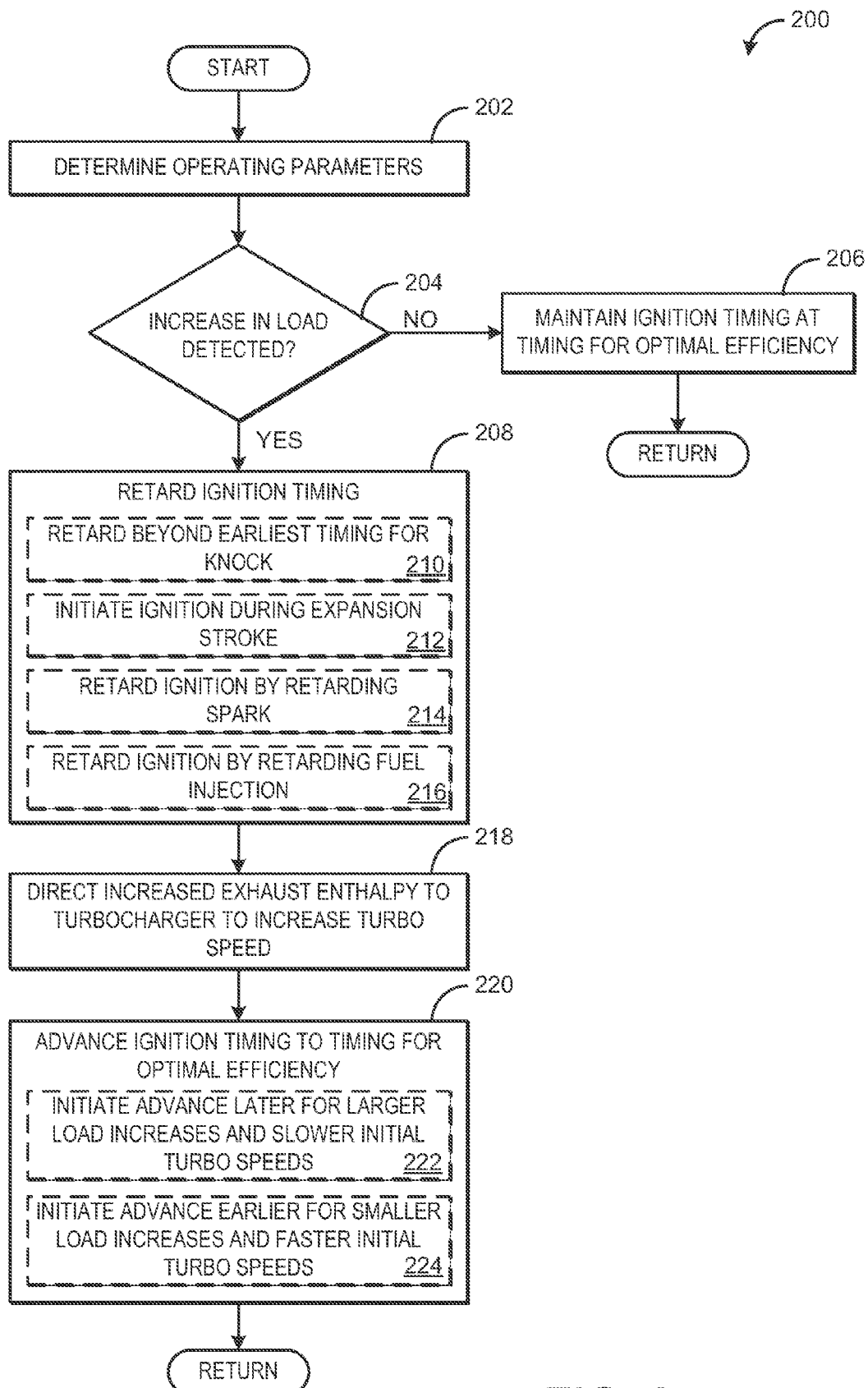
FIG. 2 is a flow chart illustrating a method for controlling ignition timing according to am embodiment of the present disclosure.

FIG. 2 is a flow chart illustrating a method 200 for controlling ignition timing. Method 200 may be carried out by controller 12 according to instructions stored thereon. Method 200 includes, at 202, determining engine operating parameters. The engine operating parameters may include engine speed (determined based on the PIP signal from sensor 118), engine load (determined based on the PIP signal from sensor 118, MAP from sensor 112, and/or other signals), engine temperature, etc. Further, the operating parameters may be monitored over time in order to determine if the operating parameters are changing (e.g., if load or speed or increasing) or remaining constant.

At 204, it is determined if engine load is increasing. The increase in engine load may include an increase above a threshold level, for example an increase of more than 10% over an initial engine load. Additionally, the increase in engine load may include an increase that occurs within a given time duration, such as one second. The increase in load may be detected based on the operating parameters described above, or the increase in load may be detected based on the position of the accelerator pedal (e.g., the pedal may be depressed past a threshold level). If an increase in load is not detected, method 200 proceeds to 206 to maintain ignition timing at a timing optimized for highest efficiency (e.g., minimum advance for best torque), which may be an ignition timing that provides maximum power for the given engine operating parameters.

If engine load is increasing, method 200 proceeds to 208 to retard ignition timing. By retarding ignition timing, the enthalpy of the exhaust may increase, thus increasing the rotational speed of the turbocharger, increasing the compression of the intake air and hence the output of the engine. Thus, a rapid increase in torque may be provided. Retarding ignition timing may include retarding timing beyond an earliest timing for avoiding knock combustion at 210. In addition to selecting an ignition timing for providing maximum power, the ignition timing may be set to avoid knock combustion. Knocking is defined by one or more areas of combustion outside the envelope of initial combustion, and may cause engine damage. Knocking may be prevented by selecting an ignition timing optimized to avoid knock. However, according to the method of the present disclosure, the ignition timing may be set beyond the earliest time for avoiding knock, to further increase the amount of exhaust enthalpy.

Retarding ignition timing may include initiating ignition during the expansion stroke of the engine cycle at 212. Typically, combustion is initiated during the compression stroke when the piston is reaching top dead center. According to the method disclosed herein, ignition timing may be pushed back into the expansion stroke to expel less energy counteracting the movement of the piston and more energy towards increasing the heat of combustion and thus the exhaust enthalpy.

The ignition timing may be retarded by retarding spark timing, as indicated at 214. In spark-ignition engines, ignition timing may be controlled by controlling the timing of the introduction of the spark used to start combustion. However, in compression-ignition engines, the ignition timing may be retarded by retarding the timing of fuel injection, as indicated at 216.

At 218, the increased exhaust enthalpy produced during combustion is directed to the turbocharger in order to increase the rotational speed of the turbocharger and the amount of compression of the intake air. At 220, ignition timing is advanced back to the timing optimized for efficiency. The duration of the ignition retard, and hence the initiation of the ignition advance, may be a function of a number of engine operating parameters monitored prior to the initial ignition retard as well as the speed and load of the engine during the ignition retard. The initial size of the requested increase in load as well as the initial speed of the turbocharger may impact when the ignition timing is advanced. As indicted at 222, the ignition advance is initiated later for larger increases in load and slower turbocharger speeds. Thus, the larger the load step and slower the initial turbocharger speed, the longer the ignition timing is retarded and the later the ignition advance is initiated. Conversely, as indicated at 224, the ignition advance is initiated earlier for smaller increases in load and faster turbocharger speeds. In this way, the smaller the requested load change and/or smaller the amount of increase in turbocharger rotational speed that is needed, the shorter the ignition timing is retarded and the earlier the ignition advance is initiated. Additionally or alternatively, the ignition advance may be initiated when engine load reaches the setpoint (e.g., requested) load. Method 200 then returns.

Thus, method 200 of FIG. 2 provides for a method for an engine coupled to a turbocharger. The method comprises during an increase in load, increasing rotational speed of the turbocharger by temporarily retarding ignition timing of the engine. Retarding ignition timing may include retarding spark timing beyond an earliest spark timing to avoid knocking combustion and/or may include initiating spark during an expansion phase of an engine cycle of the engine. In embodiments, the method comprises increasing rotational speed of the turbocharger by temporarily retarding ignition timing of the engine in response to an increase in load.

Furthermore, the method comprises retarding the ignition timing for a duration based on a size of the load increase and initial turbocharger speed, and after the duration, advancing ignition timing to a timing for maximum power. The timing for maximum power may be the same ignition timing optimized for efficiency described above, as the timing optimized for efficiency provides maximum power for the given operating conditions. The method also includes, as the size of the load increase increases, the duration increases, and as the initial turbocharger speed increases, the duration decreases.

In this way, the method presented above initiates an ignition timing retard in response to a requested increase in engine load. The ignition retard may result in ignition occurring during the expansion stroke rather than the compression stroke. Thus, the combustion energy may be directed towards increasing combustion heat and hence exhaust enthalpy rather than towards counteracting the upward movement of the piston. The increased exhaust enthalpy is then directed to the turbocharger, where it results in increased turbocharger rotational speed and increased intake air compression. Together, this facilitates a rapid increase in torque output by the engine.

After retarding ignition timing, the ignition timing may be transitioned back to an earlier ignition timing optimized for maximum power and efficiency. The timing of the transition to the earlier ignition timing may be based on the conditions of the engine at the start of the load increase. For example, the transition timing may be based on a size of the load step (later for larger step increases as compared to smaller step increases), a starting speed of the turbocharger (earlier for higher starting speeds of the turbocharger than for lower starting speeds), and/or additional operating parameters, such as engine temperature (e.g., later transitions back to earlier ignition timing for colder engine temperatures). In doing so, the duration of the ignition retard may be optimized for the particular conditions during the load increase.

The power demand of a driver during the course of a load step (otherwise referred to as a load increase) may, when using the ignition method according to the disclosure, be met more quickly because the charge pressure required for the demanded load is built up more quickly as a result of the increased exhaust-gas enthalpy.

The method according to the disclosure has, during the course of a load step, a completely different preference for the setting of the ignition time $\alpha_Z$ than the ignition methods known previously, the first priority of which is the avoidance of knocking combustion with the highest possible efficiency, with all other aims being subordinate. In this respect, a completely different, unconventional approach is followed with the use of the ignition method according to the disclosure.

Examples of the method are advantageous in which the ignition time $\alpha_Z$ is shifted abruptly in the late direction in the event of a load step $\Delta p_{me}$. The power demand of a driver during the course of a load step should be responded to as quickly as possible, and it is therefore advantageous if the ignition time $\alpha_Z$ is shifted in the late direction with the least possible delay, that is to say abruptly, in the event of a load step $\Delta p_{me}$.

Examples of the method are advantageous in particular in which, in the event of a load step $\Delta p_{me}$, the ignition time $\alpha_Z$ is shifted in the late direction from an ignition time $\alpha_{Z,opt}$, which is optimized with regard to efficiency and which lies in the compression phase, into the expansion phase.

The above method variant ensures that the energy chemically bound in the fuel is utilized primarily for increasing the exhaust-gas enthalpy, and is introduced to a lesser extent in the form of expansion work into the piston and the crankshaft.

In the expansion phase, the piston moves again from top dead center (TDC) in the direction of bottom dead center (BDC). A combustion taking place during the expansion thus contributes less to accelerating the piston and more to increasing the temperature and pressure of the exhaust gas.

In contrast, combustion initiated by ignition and starting to take place during the compression phase would counteract the upward movement of the piston, and would serve primarily for accelerating the piston when TDC is overshot, that is to say would be consumed by expansion work.

Examples of the method are advantageous in which the load step $\Delta p_{me}$ amounts to more than 10 bar, preferably more than 15 bar. In particular in the event of relatively large load steps, such as for example during overtaking maneuvers, it is desired for the power demand of a driver to be responded to as quickly as possible, for which reason the use of the method according to the disclosure has proven to be advantageous in particular in the case of load steps of the order of magnitude in question.

Examples of the method are advantageous in which, in the event of a load step $\Delta p_{me}$, the ignition time $\alpha_Z$ is shifted in the late direction by more than 10° CA from an ignition time $\alpha_{Z,opt}$ optimized with regard to efficiency, that is to say an ignition angle adjustment of $\Delta\alpha_Z \geq 10°$ CA is carried out as soon as a load step is detected. In general, the ignition time $\alpha_Z$ is specified in ° CA, as a result of which it is advantageous and expedient for the ignition angle adjustment $\Delta\alpha_Z$ to likewise be specified in ° CA.

Examples of the method are also advantageous in which, in the event of a load step $\Delta p_{me}$, the ignition time $\alpha_Z$ is shifted in the late direction by more than 15° CA from an ignition time $\alpha_{Z,opt}$ optimized with regard to efficiency.

Examples of the method may however also be advantageous in which, in the event of a load step $\Delta p_{me}$, the ignition time $\alpha_Z$ is shifted in the late direction by more than 20° CA from an ignition time $\alpha_{Z,opt}$ optimized with regard to efficiency.

The order of magnitude which the ignition angle adjustment $\Delta\alpha_Z$ should be suitably selected to have in the specific individual case, that is to say by how many degrees crank angle (° CA) the ignition time $\alpha_Z$ should be shifted in relation to an ignition time $\alpha_{Z,opt}$ optimized with regard to efficiency, is dependent on a multiplicity of factors, inter alia on the magnitude of the load step $\Delta p_{me}$ and on the internal combustion engine in which the method is to be implemented, in particular also on the number of turbochargers and the arrangement thereof.

It is basically sought to arrange the turbine as close as possible to the outlet openings of the cylinders, because as small a line volume as possible should be realized upstream of the turbine in order to improve the response behavior. As close-coupled an arrangement as possible however cannot be realized in every individual case, such that the turbine may possibly be arranged further remote from the outlet of the internal combustion engine than is desirable with regard to satisfactory response behavior. The further remote the turbine is arranged in the exhaust-gas discharge system, the greater is the demand to improve the response behavior of the turbine or of the charger in the event of a load step, that is to say to implement the method according to the disclosure.

Embodiments of the method are advantageous in which, for the ignition time $\alpha_Z$, the following applies: 0° CA after TDC $\leq \alpha_Z \leq$ 30° CA after TDC.

Embodiments of the method are also advantageous in which, for the ignition time $\alpha_Z$, the following applies: 5° CA after TDC $\leq \alpha_Z \leq$ 20° CA after TDC.

However, embodiments of the method may also be advantageous in which, for the ignition time $\alpha_Z$, the following applies: 10° CA after TDC $\leq \alpha_Z \leq$ 25° CA after TDC.

The three method variants above have in common the fact that the ignition of the fuel-air mixture takes place in the expansion phase. It is ensured in this way that the energy chemically bound in the fuel is utilized primarily to increase the exhaust-gas enthalpy. Reference is made to the statements which have already been made in conjunction with an ignition in the expansion phase, and the advantages mentioned.

For the operation of an applied-ignition internal combustion engine, that is to say of a spark-ignition engine, variants of the method are advantageous in which the ignition time $\alpha_Z$ is adjusted by means of applied ignition.

For the operation of an auto-ignition internal combustion engine, that is to say of a diesel engine, variants of the method are advantageous in which the ignition time $\alpha_Z$ is adjusted by means of injection, in particular by means of the start of injection (SOI) but also by means of the rate of injection.

The method presented above may be carried out in an internal combustion engine having an engine controller and having at least one exhaust-gas turbocharger, which comprises a turbine arranged in an exhaust-gas discharge system and a compressor arranged in an intake system, said internal combustion engine being characterized in that the engine controller is set up such that, in the event of a load step $\Delta p_{me}$, the ignition time $\alpha_Z$ is shifted in the late direction proceeding from an ignition time $\alpha_{Z,opt}$ optimized with regard to efficiency, specifically is shifted in the late direction beyond an ignition time $\alpha_{Z,knock}$, where $\alpha_{Z,knock}$ is the earliest ignition time for avoiding knocking combustion.

That which has already been stated with regard to the method according to the disclosure also applies to the internal combustion engine according to the disclosure, for which reason reference is made at this juncture to the statements made above with regard to the method.

Different examples for the internal combustion engine emerge corresponding to the different method variants. Examples of the internal combustion engine are advantageous in which a direct injection is carried out for introducing the fuel.

As already mentioned in the introduction, it is sought to reduce the throttling losses in the spark-ignition working process in order to reduce the fuel consumption, for example through the use of a variable valve drive.

In spark-ignition engines or applied-ignition internal combustion engines, the injection of fuel directly into the combustion chamber is likewise a suitable measure for reducing fuel consumption, and therefore the development of direct-injection spark-ignition engines is of ever greater importance.

Examples of the internal combustion engine are advantageous in which an ignition device is provided for initiating an applied ignition by means of the engine controller.

Thus, the methods and systems disclosed herein provide for an internal combustion engine comprising at least one exhaust-gas turbocharger, which comprises a turbine arranged in an exhaust-gas discharge system and a compressor arranged in an intake system, and an engine controller configured to, in response to a load increase $\Delta p_{me}$, shift ignition time $\alpha_Z$ in a late direction proceeding from an ignition time $\alpha_{Z,opt}$ optimized with regard to efficiency, and beyond an ignition time $\alpha_{Z,knock}$, where $\alpha_{Z,knock}$ is an earliest ignition time for avoiding knocking combustion.

Within the context of the present disclosure, the expression "internal combustion engine" encompasses in particular spark-ignition engines but also diesel engines and hybrid internal combustion engines, that is to say internal combustion engines which are operated using a hybrid combustion process. An internal combustion engine of the above-stated type is used for example as a drive for a motor vehicle.

Turning now to FIGS. 3a to 3d, they show, in each case in the form of a diagram, the profile of a certain operating parameter of the internal combustion engine over time t, specifically during a load step $\Delta p_{me}$ (e.g., load increase) at n=1500 rpm. The respective operating parameter is plotted in each case on the ordinate, and the time t is plotted along the abscissa.

The illustrations show the profiles of four operating parameters, specifically of the ignition angle $\alpha_Z$, of the mean effective pressure $p_{me}$, of the rotational speed $n_{TS}$ of the turbocharger, and of the charge pressure $p_{compressor}$, wherein the illustrations show both the profile when using a conventional method (solid line) and also the profile when using the method according to the disclosure (line composed of non-filled squares).

FIG. 3a shows a diagram of the profile of the ignition angle $\alpha_Z$ over time t, wherein the ignition angle $\alpha_Z$ is plotted proceeding from TDC of the combustion cycle and an adjustment in the late and early directions means, respectively, an adjustment in the direction of expansion and in the direction of the preceding compression.

In the conventional method, in the event of a load step, the ignition time $\alpha_Z$ is shifted in the late direction from an ignition time $\alpha_{Z,opt}$ optimized with regard to efficiency. The ignition angle adjustment $\Delta\alpha_Z$ is relatively small because typically it is sought to reliably avoid knocking combustion. The ignition time $\alpha_Z$ is therefore shifted in the late direction no further than an ignition time $\alpha_{Z,knock}$ which is the earliest ignition time to avoid knocking combustion. The ignition is initiated, initially unchanged, in the compression phase, and is shifted, only toward the end of the load step, to a time shortly after TDC is overshot, that is to say into the expansion phase.

In the method according to the disclosure, the ignition time $\alpha_Z$ is shifted in the late direction from an ignition time $\alpha_{Z,opt}$, which is optimized with regard to efficiency and which lies in the compression phase, into the expansion phase, specifically in an abrupt manner. The ignition in the expansion phase ensures that the energy released by the combustion of the fuel is utilized primarily for increasing the exhaust-gas enthalpy.

The ignition angle adjustment $\Delta\alpha_Z$ is significantly more pronounced than in the conventional systems, wherein, contrary to the conventional approach, the ignition time $\alpha_Z$ is shifted in the late direction beyond the ignition time $\alpha_{Z,knock}$, without consideration being given to the possible occurrence of knocking combustion, and without the ignition angle adjustment thereby being regulated. Over the further course of the profile, the actual power approaches the setpoint power, and the ignition is moved back again, that is to say adjusted in the early direction, in order to realize as high an efficiency as possible.

FIG. 3b shows a diagram of the profile of the mean effective pressure $p_{me}$ over time t. The influence of the different ignition methods can be clearly seen. After only a short time, the application of the ignition method according to the disclosure has an advantageous effect on the mean effective pressure $p_{me}$.

FIGS. 3c and 3d show diagrams of the rotational speed $n_{TS}$ of the exhaust-gas turbocharger and of the charge pressure $p_{compressor}$ over time t during the load step at n=1500 rpm.

The advantageous effects of the ignition method according to the disclosure on said two operating parameters can be clearly seen.

Since it is the case according to the disclosure that the ignition, and with the latter, the combustion, are shifted in the late direction to a significant extent, a greater than conventional proportion of the energy released during the combustion is invested in increasing the exhaust-gas enthalpy, such that the exhaust gases which act on the turbine have a considerably higher enthalpy.

The turbine of the exhaust-gas turbocharger is accelerated faster, that is to say the rotational speed $n_{TS}$ increases more quickly, and the power demanded during the course of the load step is provided more quickly because the charge pressure $p_{compressor}$ required for the demanded power is built up more quickly as a result of the increased exhaust-gas enthalpy.

It will be appreciated that the configurations and methods disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for operating a supercharged internal combustion engine including at least one exhaust-gas turbocharger which has a turbine arranged in an exhaust-gas discharge system and a compressor arranged in an intake system, comprising:
during an engine load increase $\Delta p_{me}$, increasing rotational speed of the turbocharger by retarding ignition timing away from an ignition time $\alpha_{Z,opt}$ optimized with regard to efficiency and beyond an ignition time $\alpha_{Z,knock}$, where $\alpha_{Z,knock}$ is an earliest ignition time to avoid knocking combustion.

2. The method as claimed in claim 1, wherein the ignition time $\alpha_Z$ is retarded abruptly during the load increase $\Delta p_{me}$.

3. The method as claimed in claim 1, wherein, during the load increase $\Delta p_{me}$, the ignition time $\alpha_Z$ is retarded away from the ignition time $\alpha_{Z,opt}$, which is optimized with regard to efficiency and which lies in a compression phase, into an expansion phase of the engine.

4. The method as claimed in claim 1, wherein load increase $\Delta p_{me}$ comprises more than 10 bar.

5. The method as claimed in claim 1, wherein the load increase $\Delta p_{me}$ comprises more than 15 bar.

6. An internal combustion engine system, comprising:
at least one cylinder configured to receive fuel and undergo combustion;
at least one exhaust-gas turbocharger, which comprises a turbine arranged in an exhaust-gas discharge system and a compressor arranged in an intake system; and
an engine controller configured to, during an engine load increase $\Delta p_{me}$, increase rotational speed of the turbocharger by shift ignition time $\alpha_Z$ in a late direction proceeding from an ignition time $\alpha_{Z,opt}$ optimized with regard to efficiency, and beyond an ignition time $\alpha_{Z,knock}$, where $\alpha_{Z,knock}$ is an earliest ignition time for avoiding knocking combustion.

7. The internal combustion engine system as claimed in claim 6, wherein the at least one cylinder receives fuel via direct injection.

8. The internal combustion engine system as claimed in claim 6, further comprising an ignition device for initiating an applied ignition via the engine controller.

9. A method for an engine, comprising:
during an engine load increase, increasing rotational speed of a turbocharger by temporarily retarding ignition timing of the engine for a duration, the duration based on a size of the load increase and an initial turbocharger speed.

10. The method of claim 9, further comprises retarding spark timing beyond an earliest spark timing to avoid knocking combustion.

11. The method of claim 9, wherein retarding ignition timing further comprises initiating spark during an expansion phase of an engine cycle of the engine.

12. The method of claim 9, further comprising, after the duration, advancing ignition timing to a timing for maximum power, wherein as the size of the load increase increases, the duration increases, and as the initial turbocharger speed increases, the duration decreases.

13. The method as claimed in claim 12, wherein the load increase comprises more than 10 bar.

14. The method as claimed in claim 12, wherein the load increase comprises more than 15 bar.

15. The method as claimed in claim 9, wherein the ignition timing is between 0° CA after TDC and 30° CA after TDC.

16. The method as claimed in claim 9, wherein the ignition timing is between 5° CA after TDC and 20° CA after TDC.

17. The method as claimed in claim 9, wherein the ignition timing is between 10° CA after TDC and 25° CA after TDC.

18. The method as claimed in claim 9, wherein, during the load increase, the ignition timing is retarded by more than 10° CA from an ignition timing optimized with regard to efficiency.

19. The method as claimed in claim 9, wherein, during the load increase, the ignition timing is retarded by more than 15° CA from an ignition timing optimized with regard to efficiency.

20. The method as claimed in claim 9, wherein, during the load increase, the ignition timing is retarded by more than 20° CA from an ignition timing optimized with regard to efficiency.

* * * * *